(12) United States Patent
Reinders et al.

(10) Patent No.: US 11,845,039 B2
(45) Date of Patent: Dec. 19, 2023

(54) WATER EXTRACTING DEVICE

(71) Applicant: OXYCOM BEHEER B.V., Raalte (NL)

(72) Inventors: Berend Jan Reinders, Raalte (NL); Johannes Antonius Maria Reinders, Warnsveld (NL); Mark Hakbijl, Zwolle (NL); Alexander John Banz, St-Prex (CH)

(73) Assignee: Oxycom Beheer B.V., Raalte (NL)

( * ) Notice: Subject to any disclaimer, the term of this patent is extended or adjusted under 35 U.S.C. 154(b) by 750 days.

(21) Appl. No.: 14/916,084

(22) PCT Filed: Sep. 15, 2014

(86) PCT No.: PCT/NL2014/050630
§ 371 (c)(1),
(2) Date: Mar. 2, 2016

(87) PCT Pub. No.: WO2015/037996
PCT Pub. Date: Mar. 19, 2015

(65) Prior Publication Data
US 2016/0220951 A1    Aug. 4, 2016

(30) Foreign Application Priority Data

Sep. 13, 2013 (NL) .................................. 2011443

(51) Int. Cl.
*B01D 46/00* (2022.01)
*B01D 53/28* (2006.01)
(Continued)

(52) U.S. Cl.
CPC ......... *B01D 53/28* (2013.01); *B01D 53/0438* (2013.01); *B01D 53/261* (2013.01);
(Continued)

(58) Field of Classification Search
CPC .. B01D 53/28; B01D 53/0438; B01D 53/261; B01D 53/263; B01D 2239/0291;
(Continued)

(56) References Cited

U.S. PATENT DOCUMENTS 4,469,746 A * 9/1984 Weisman ............... A61L 15/18
427/397.7
5,133,878 A * 7/1992 Gsell .................. B01D 39/1623
210/496

(Continued)

FOREIGN PATENT DOCUMENTS

EP    0 501 301 A1    9/1992
EP    1 840 486 A1    10/2007
(Continued)

OTHER PUBLICATIONS

Helen Yang et al., "Temperature-Triggered Collection and Release of Water from Fogs by a Sponge-Like Cotton Fabric," Materials Views, Advanced Materials, pp. 1-5 (Jan. 9, 2013). (Year: 2013).*

(Continued)

*Primary Examiner* — T. Bennett McKenzie
(74) *Attorney, Agent, or Firm* — N.V. Nederlandsch Octrooibureau

(57) ABSTRACT

A device for extracting water vapour from a fluid stream includes a carrier structure, a substrate of fibrous material provided on the carrier structure, the fibrous material including a plurality of individual fibres, a quantity of an LCST polymer coating the individual fibres; and a heating provision arranged to selectively heat the LCST polymer to above its lower critical temperature whereby water absorbed by the fibres can be subsequently released on heating. By providing the LCST polymer as a coating onto the fibres, an increased surface area may be achieved.

19 Claims, 5 Drawing Sheets

(51) Int. Cl.
*B01D 53/04* (2006.01)
*B01D 53/26* (2006.01)

(52) U.S. Cl.
CPC .... *B01D 53/263* (2013.01); *B01D 2239/0291* (2013.01); *B01D 2252/2053* (2013.01); *B01D 2253/202* (2013.01); *B01D 2257/80* (2013.01); *B01D 2258/06* (2013.01); *B01D 2259/40096* (2013.01)

(58) Field of Classification Search
CPC ...... B01D 2252/2053; B01D 2253/202; B01D 2257/80; B01D 2258/06; B01D 2259/40096; E03B 3/28
USPC ...................................... 95/273; 62/272–291
See application file for complete search history.

(56) References Cited

U.S. PATENT DOCUMENTS

| | | | | |
|---|---|---|---|---|
| 5,768,897 | A * | 6/1998 | Rainville | B01D 53/261 62/271 |
| 6,050,100 | A | 4/2000 | Belding et al. | |
| 7,264,649 | B1 | 9/2007 | Johnson et al. | |
| 2002/0035924 | A1 * | 3/2002 | Keefer | B01D 53/047 95/113 |
| 2005/0044862 | A1 * | 3/2005 | Vetrovec | A01G 29/00 62/93 |
| 2006/0091228 | A1 | 5/2006 | Hsu et al. | |
| 2007/0163217 | A1 * | 7/2007 | Frey | B01D 39/18 55/482 |
| 2008/0102744 | A1 * | 5/2008 | Moore | B01D 53/30 454/239 |
| 2011/0061413 | A1 * | 3/2011 | Setoguchi | F24F 3/065 62/238.7 |
| 2011/0120685 | A1 * | 5/2011 | Van Heeswijk | F28D 5/00 165/170 |
| 2011/0265436 | A1 * | 11/2011 | Platt | B01D 27/06 55/493 |
| 2013/0319233 | A1 * | 12/2013 | Ball | B01D 53/0454 95/126 |
| 2014/0174295 | A1 * | 6/2014 | Tai | B01D 53/0407 96/111 |

FOREIGN PATENT DOCUMENTS

| | | | | |
|---|---|---|---|---|
| WO | | 03/091633 | A1 | 11/2003 |
| WO | WO | 2007026023 | A1 * | 3/2007 ........... B01D 53/261 |
| WO | WO- | 2007026023 | A1 * | 3/2007 ............ B01D 53/28 |
| WO | | 2007/043863 | A1 | 4/2007 |
| WO | | 2007/061298 | A1 | 5/2007 |
| WO | | 2007/026023 | A1 | 8/2007 |
| WO | | 2008/055981 | A1 | 5/2008 |

OTHER PUBLICATIONS

Lantor nl. Cable Products, Product data sheet 3C7020, Semi conductive nonwoven tape, Issue date: Apr. 1998, Rev. date: Dec. 2010.
Helen Yang et al.: "Temperature-Triggered Collection and Release of Water from Fogs by a Sponge-Like Cotton Fabric", Materials Views, Advanced Materials, pp. 1-5.
International Search Report, dated Nov. 5, 2014, from corresponding PCT application.

* cited by examiner

WATER EXTRACTING DEVICE

BACKGROUND OF THE INVENTION

1. Field of the Invention

The present invention relates to water extracting devices, in particular, to devices for the removal of water vapour from the air using smart polymer materials. The invention also relates to a system incorporating such a device and a method of extracting water vapour from an air stream.

2. Description of the Related Art

Vapour extraction devices are conventionally used in many situations where it is desired to reduce the vapour content of or otherwise dry an air stream. In particular, in heating, ventilating and air conditioning systems removal of excess moisture from an air stream is often desirable. Other situations where water vapour may be extracted include clothes dryers, industrial desiccation and dehumidifiers.

One form of vapour extracting device is known as a desiccant wheel and uses a desiccant such as silica gel to absorb moisture. The desiccant is provided on a carrier layer, convoluted or corrugated to form a multitude of passages having a large surface area. The carrier layer is rolled up or otherwise arranged to form a wheel-shaped structure with the passages aligned with an axis of the wheel. In use, the air to be dried is passed through a first sector of the wheel as a first air stream. The desiccant has a greater affinity to water than does the air and moisture in the air is taken up by the desiccant. Silica gel in particular is extremely effective in that it can absorb many times its own weight in water until it finally becomes saturated. During operation, the wheel turns and the parts of the wheel that have become saturated rotate out of the first air stream. They are then exposed to a second stream of high temperature air. The second air stream operates to dry the desiccant by effectively boiling off the absorbed water. Considerable energy, equal to the latent heat of evaporation, is required in order to evaporate this water. Such desiccant devices are also generally relatively large and cumbersome. More recently, alternative (smart) materials have been discovered that are capable of selectively absorbing particular substances and releasing them in response to a stimulus. One class of such materials are referred to as LCST polymers. These materials are known for their ability to change state at the so-called Lower Critical Solution Temperature (LCST) from a relatively hydrophilic to a relatively hydrophobic form. At present these polymers have been used primarily for bio-medical purposes. An example of such materials is given in EP 501 301, the contents of which are herein incorporated by reference in their entirety. It has been suggested that such materials could be used for extracting water entrained in a flow of humid air. A vapour extraction device has been disclosed in WO2007/026023, the contents of which are also herein incorporated by reference in their entirety. Although the principle of operation shows great promise, the practicalities of implementation have, until now, been difficult to overcome. In particular, the cost of such materials is high and their effective incorporation into existing devices has not been realised.

Accordingly, it would be desirable to provide an LCST polymer based device that operated effectively and was easy to manufacture. It would be furthermore desirable to provide a system for water vapour extraction that would be useful in the field of evaporative cooling systems. Evaporative cooling systems make use of the latent heat of evaporation of water into an air stream to extract heat. Indirect evaporative coolers and "dew-point coolers" cool a product air stream by evaporation into a working air stream. If the working air stream already has high relative humidity, then the amount of water vapour that it can absorb is limited. One such dew-point cooler is known from WO03/091633, the contents of which are herein incorporated by reference in their entirety. A further device is known from document U.S. Pat. No. 6,050,100, the contents of which are also incorporated by reference in their entirety. This document describes how a desiccant wheel could be incorporated in a system comprising an indirect evaporative cooler. A burner is required to regenerate the desiccant wheel, requiring significant energy input. Furthermore, the heat of absorption of the moisture and the regeneration of the wheel can cause the air flow to be heated to as much as 80° C. It would therefore be desirable to provide an efficient manner of reducing the humidity of the incoming air to such evaporative coolers in order to increase the effective cooling capacity. The energy required to perform vapour extraction should nevertheless be minimal.

There is thus a need for alternative vapour extracting devices that can operate away from the saturation line and that do not require elevated energy input. Such devices should be cheap and simple to produce and also be relatively small for better integration into existing systems.

BRIEF SUMMARY OF THE INVENTION

According to the invention there is provided a device for extracting water vapour from a fluid stream that attempts to alleviate some of the above-mentioned drawbacks. The device comprises a carrier structure, a substrate of fibrous material provided on the carrier structure, the fibrous material comprising a plurality of individual fibres, a quantity of an LCST polymer coating the individual fibres; and a heating provision arranged to selectively heat the LCST polymer to above its lower critical temperature whereby water absorbed by the fibres can be subsequently released on heating. By providing the LCST polymer as a coating onto the fibres, an increased surface area may be achieved and the ability of the LCST polymer to absorb water is augmented by the physical form of the fibres, which are able to retain water by surface tension effects. In the present context, reference to an LCST polymer is intended to denote a material in the broadest sense that is capable of absorbing water in a first state and releasing it in a second state, whereby transition between the two states can take place in response to an external stimulus. An important consideration is that the water can be released without requiring it to be evaporated. In general, reference will be made to absorption of moisture, nevertheless, materials that adsorb moisture are also considered to be included within the scope of this term.

The carrier structure may be any appropriate structure that can support the fibres to perform their function. In general the carrier structure will be a separate layer although it may also be in the form of a skeleton on which the fibres are arranged. The carrier structure may be a foil or gauze and may be formed of e.g. a metal or a plastics material. Paper or carton may also be used. The carrier structure may also be at least partially integrated with the heating provision and a heating layer on which the fibrous material was supported could already achieve the desired carrier function. In a preferred embodiment, the carrier structure comprises a conducting metal foil of e.g. aluminium. A particular advantage of such a foil is that it allows the device to be readily formed into complex shapes using conventional forming processes such as rolling, stamping or the like. Another advantage of a conducting metal foil is that it can also be used for heat transfer. This permits the device to be multi-functional both in extracting moisture and also in transferring heat that may be associated with such absorption. It also allows the heating provision to be applied on a first surface of the carrier structure, with the fibrous material and LCST polymer on the opposite surface.

In an alternative embodiment the carrier structure may comprise an insulating foil. The insulating foil may be thermally insulating and/or electrically insulating. Preferably the insulating foil is formed of plastics material. For regeneration of the LCST material, a high resistance heating element may be formed onto the carrier structure, which due to its electrically insulating nature will not allow short circuit of the heating element. The skilled person will be well aware of the properties and advantages that may be achieved by the use of such plastics.

According to a particularly important aspect of the invention, the carrier structure may comprise a plurality of fins and the fibrous material is provided on the fins. The provision of a fin structure increases further the ability of the device to quickly take up water by increasing the mass transfer between an air supply across the device and the LCST polymer provided on the carrier structure. Various fin structures may be envisaged but most preferably, the fins are deformed from a flat sheet or plate such as that disclosed in WO2008055981, the contents of which are herein incorporated by reference in their entirety.

For use in extracting water vapour, a LCST material may be chosen that is relatively hydrophilic in the first state and relatively hydrophobic in the second state. In one form of operation, after absorbing water vapour in the first state the material may then release liquid water on switching to the second state. Of particular significance in this case, the phase change from vapour to liquid takes place on absorption of the vapour by the material and is not reversed on releasing the water on switching to the second state. The energy required to release the water from the material on switching may thus be considerably less than the energy required to evaporate a similar quantity of water from a silica gel or similar desiccant. The fibrous material with LCST polymer thereon may be provided on the either one or both surfaces of the carrier structure.

As indicated above, the term LCST polymer is intended to denote a stimulus responsive polymer, in particular of the LCST type. These materials are known for their ability to change state at the so-called Lower Critical Solution Temperature (LCST) from a relatively hydrophilic to a relatively hydrophobic form. LCST polymers exhibit thermally reversible soluble-insoluble changes in aqueous solutions in response to temperature changes. A most preferred form of LCST polymer is poly(N-isopropyl acrylamide) (PNIPAM). Other LCST polymers include polysilanes and polysilynes such as poly(4,7,10-trioxaundecylsilyne) and poly(4,7,10,13-tetraoxatetradecylsilyne), poly(dimethylamino ethyl methacrylate) (PDMAEMA) and polyoxazolines using ethyl and isopropyl groups, in particular poly(2-ethyl-2-oxazoline) (PETOX) and poly(2-isopropyl-2-oxazoline). Upon raising the temperature of an aqueous solution of such polymers, reversible phase separation occurs at the lower critical solution temperature (LCST). In aqueous solution at ambient temperatures below the LCST, the polymer is present as a highly folded random coil. Above the LCST its polymer backbone adopts a more extended conformation and water is released. The position of the LCST can be tuned over a large temperature range (27° C. to 75° C.) by addition of inorganic salts or co-monomers or by other appropriate methods known to the skilled person. Furthermore, by the addition of cross-linking agents, the stability of the structure can be improved in order to ensure that the material remains in solid or gel form. In the case of poly(ethyloxazolines) it has been suggested that the presence of more than 30% of a cross-linking agent (2-isopropenyl-2-oxazoline) can prevent the polymer becoming liquid on absorption of water.

In the preferred embodiment according to the invention, the material switches from the first state to the second state in response to heat. This is the preferred form of operation for polysilane materials whereby heating to the LCST causes switching to occur. For use in a climate control system, the LCST may be set to a switching temperature slightly above the highest temperatures usually encountered. Heating the material to this switching temperature causes regeneration of the material to take place. The switching temperature will nevertheless be below 100° C. as elevation to above this temperature would effectively require boiling of the water and significant energy loss. Most preferably, the LCST is between 25° C. and 70° C. more preferably between 30° C. and 50° C. In the case of PNIPAAm, this temperature is generally around 35° C. The skilled person will recognise that although LCST polymers, responsive to a heat stimulus have been described, other activation forms may be used to cause the material to switch from the first state to the second state e.g. in response to an electric potential, an electric current, a magnetic field, electromagnetic radiation, pH, vibration or mechanical stress.

According to the invention, the fibres may be any appropriate fibre on which the LCST polymer material can be coated. The fibres can be natural or synthetic and are preferably present as individual fibres rather than yarns or twines. Most preferably, the fibres comprise cotton although other natural and synthetic fibres and mixtures of fibres may also be used. Furthermore, the fibrous material is preferably in the form of a non-woven, although woven materials may also be contemplated. The fibres themselves (prior to coating) may have a diameter of between 5 microns and 500 microns, preferably around 50 microns.

The heating provision may comprise any suitable provision for causing the LCST polymer to switch from its first state to its second state. This may be in the form of a heater, a supply of heated air or even a facility to expose the device to the sun or another source of heat. In a most preferred embodiment, the heating provision comprises a resistive heating element provided on the carrier structure. The resistive heating element may comprise a carbon containing layer. Such layers are well known for providing distributed heating onto surfaces and have been used on aircraft wings, wind turbine blades and the like. Carbon black is particularly suited for this purpose although graphite may also be used. The carbon may be deposited onto the carrier structure as a thin layer, preferably by inkjet deposition whereby a particular distribution may be achieved. The carbon containing layer may thus cover certain regions of the substrate and other regions of the substrate may be free of heating elements. Alternatively the carbon containing layer may comprise a woven or non-woven material, impregnated with carbon particles. One suitable material is carbon impregnated semi-conductive non-woven tape. The carbon containing layer may be a separate layer from the substrate of fibrous material. It is however also contemplated that both layers may be integrated. The fibrous material may be itself conductive or may be impregnated with conductive particles, whereby resistance heating may be carried out. Alternatively, the fibrous material may comprise a mixture of fibres coated with LCST polymers and other conductive fibres serving as the heating provision. Most preferably the heating element comprises a layer having a resistance per unit length of between 100 and 800 ohms per cm.

In one form, the carrier structure may comprise a generally rectangular panel and the heating element may comprise strips extending across the panel. The strips may be selectively activated by application of a voltage across them using dedicated electrodes whereby different regions of the carrier structure may be heated independently e.g. in series. The heating element may also be present in specific regions and the specific regions may be selectively activated under the control of an appropriate controller. This may be used to permit specific heating profiles to be implemented such as saw tooth and sine wave profiles and can also be implemented to provide appropriate adaptive control based on feedback of signals such as air temperature, air humidity, carrier temperature, water content and the like.

The invention also relates to a desiccant system comprising a housing having an inlet and an outlet and a device according to any preceding claim located within the housing, whereby air can flow from the inlet to the outlet over the substrate. In one embodiment, the heating provision may be considered to comprise the inlet for directing a source of hot air over the carrier structure. Alternatively, the heating provision may be a heating device provided inside the housing. Preferably the device is arranged to offer a relatively large surface area and relatively low flow resistance to the air passing through the housing. In particular, the carrier structure may be in the form of a plurality of passageways aligned with the flow direction in the manner of prior art desiccant wheels. Alternatively, open mesh and fin structures as shown in WO2008055981, offer advantageous flow characteristics as they stimulate turbulent flow and can help to reduce overall flow resistance.

In order to provide for removal of the absorbed water, the housing may further comprise a drain and a gravity flow structure leading to the drain. The water may be collected at the drain and used for any appropriate purpose; in particular, it may be used for subsequent evaporation in an evaporative cooling stage of the same or another system. The system is particularly useful in combination with an evaporative cooling device, preferably a dew-point cooler, wherein in use the flow stream is directed from the outlet to an inlet e.g. of working fluid to the evaporative cooling device. In this manner, the fluid entering the cooling device may be dehumidified in order to allow a greater uptake of moisture during cooling.

According to a still further aspect of the invention, the system may further comprise a heat exchanger communicating with the outlet, whereby air leaving the outlet can flow through the heat exchanger and be cooled. This may be particularly important in compensating for the heat of absorption due to the extraction of vapour onto the surface of the carrier structure. As mentioned above, the carrier structure may also be formed of a conducting metal foil allowing direct transfer of heat to an appropriate heat sink.

The invention also relates to a method of extracting entrained water vapour from a fluid stream using a device or system as described above or hereinafter, by passing a flow of humid air having a temperature below the lower critical temperature over the device whereby the air is in contact with the LCST polymer and the LCST polymer absorbs a quantity of water vapour; and activating the heating provision to selectively heat the LCST polymer to above its lower critical temperature whereby water absorbed on the fibres is released. Activating the heating provision preferably takes place by applying a voltage across a carbon layer provided on the carrier structure.

Preferably the method may also optionally include cooling the flow and/or the device to remove heat such as the heat of absorption of the vapour. The method may also include collecting the released product by gravity flow to a drain.

According to a yet further aspect of the invention, there is provided an LCST laminate comprising a carrier layer, a fibrous material layer, the fibrous material comprising a plurality of individual fibres and a quantity of an LCST polymer coating the individual fibres and a resistive heating layer. Such a laminate may be a self contained item of manufacture that can be subsequently adapted to any number of appropriate uses in absorbing and releasing water on demand. The carrier layer may be as the carrier structure described above prior to forming. The fibres, LCST polymer and resistive heating layer may also be as described above. In a most preferred embodiment, the laminate comprises a thin metal layer coated with an insulating lacquer and a coating of electrically conductive carbon black as a resistive heating layer. The fibrous material layer is provided on the heating element. A fibrous material layer may be provided on both sides of the aluminium layer although the heating layer need only be applied on one surface.

The LCST laminate is preferably formable into a desired shape, such as by pressing or moulding. To this end, the carrier layer may be a thin metal layer such as aluminium. In a most preferred embodiment the laminate may be cut and formed into a plurality of fins, partially separated from one another. The laminate may be embodied to have a form as described in WO2008055981. Once formed, the laminate may be provided with appropriate electrodes in order to connect to the resistive heating layer. For a laminate provided with fins, the electrodes are preferably arranged such that the potential can be applied in the direction of the fin.

BRIEF DESCRIPTION OF THE DRAWINGS

The features and advantages of the invention will be appreciated upon reference to the following drawings of a number of exemplary embodiments, in which:

FIG. 1A shows a detail of the fibrous material layer of FIG. 1 in the dry state;

FIG. 1B shows a detail of the fibrous material layer of FIG. 1 in the wet state;

DESCRIPTION OF ILLUSTRATIVE EMBODIMENTS

The following is a description of certain embodiments of the invention, given by way of example only and with reference to the drawings.

Figure 1:
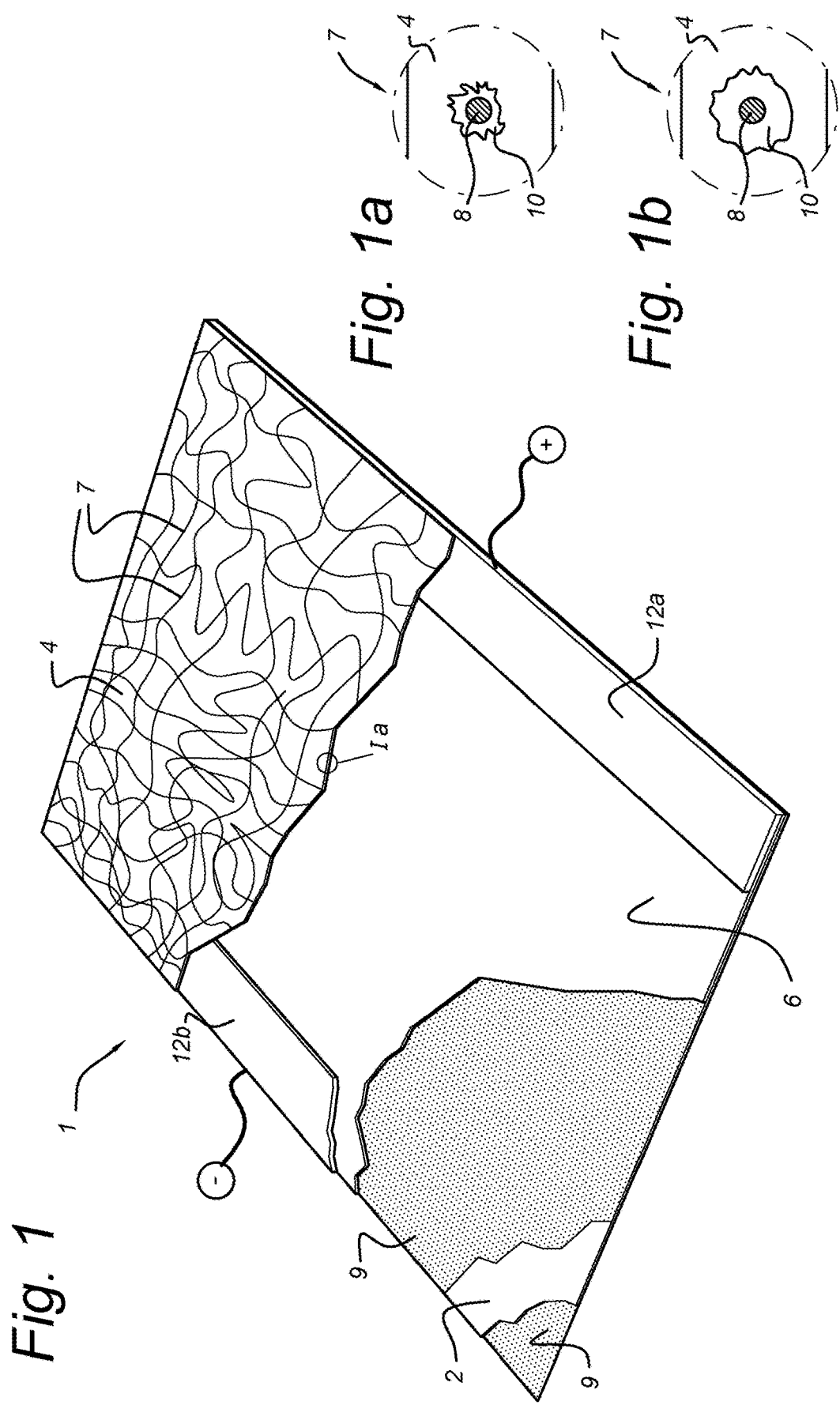
FIG. 1 shows a perspective view of a portion of a laminate according to the present invention.

FIG. 1 shows a portion of an LCST laminate 1 according to the present invention comprising a carrier layer 2, a fibrous material layer 4, and a resistive heating layer 6. The fibrous material layer 6 comprises a plurality of individual cotton fibres 7, which in this embodiment are in non-woven form. It will be understood that the fibres 7 may also be present in any other suitable arrangement as a woven, felt, knitted fabric or the like. The carrier layer 2 is a thin layer of aluminium having a thickness of around 70 microns. It is provided on both surfaces with a protective layer 9 of polymer which is both electrically insulating and protects it from corrosion. The resistive heating layer 6 is a thin non-woven layer of polyester/polyacrylate fibres impregnated with carbon particles having a thickness of around 0.3 mm and a weight of 60 g/m². The resistive heating layer 6 has a conductivity of 100 Ohms/Cm. A pair of electrodes 12a, 12b along opposed edges of the laminate is provided for applying of a voltage.

FIG. 1A shows a detail of the fibrous material layer 4, showing a cross section of the fibre 7. The fibre 7 has a core 8 having a thickness of around 20 microns. It is coated around its outer surface with a layer of PNIPAAm 10, whereby the overall thickness of the fibre 7 in the dry state is around 50 microns. The PNIPAAm layer 10 is applied using a surface-initiated atom transfer radical polymerization method to graft the PNIPAAm material directly onto the surface of the cotton core 8. The procedure may be as described in the article "Temperature-Triggered Collection and Release of Water from Fogs by a Sponge-Like Cotton Fabric"; Yang et al.; Advanced Materials 2013. In the present embodiment it is arranged to have an LCST of 35° C.

FIG. 1B shows the same detail as that of FIG. 1A in the wet state in which the PNIPAAm layer 10 has absorbed moisture and has increased considerably in size.

In use, the laminate 1 may be exposed to a flow of moist air at a temperature below the LCST of the PNIPAAm layer 10. The PNIPAAm layer 10 absorbs moisture from the air and swells from the configuration of FIG. 1A to that of FIG. 1B. Once saturation is reached, the laminate must be regenerated. To this effect, a voltage is placed across the electrodes 12A, 12B causing heating of the resistive heating layer 6 to above the LCST. At this point, the absorbed water is released by the PNIPAAm layer 10. By orienting the laminate 1 vertically, the water can drain away as droplets.

Figure 2:
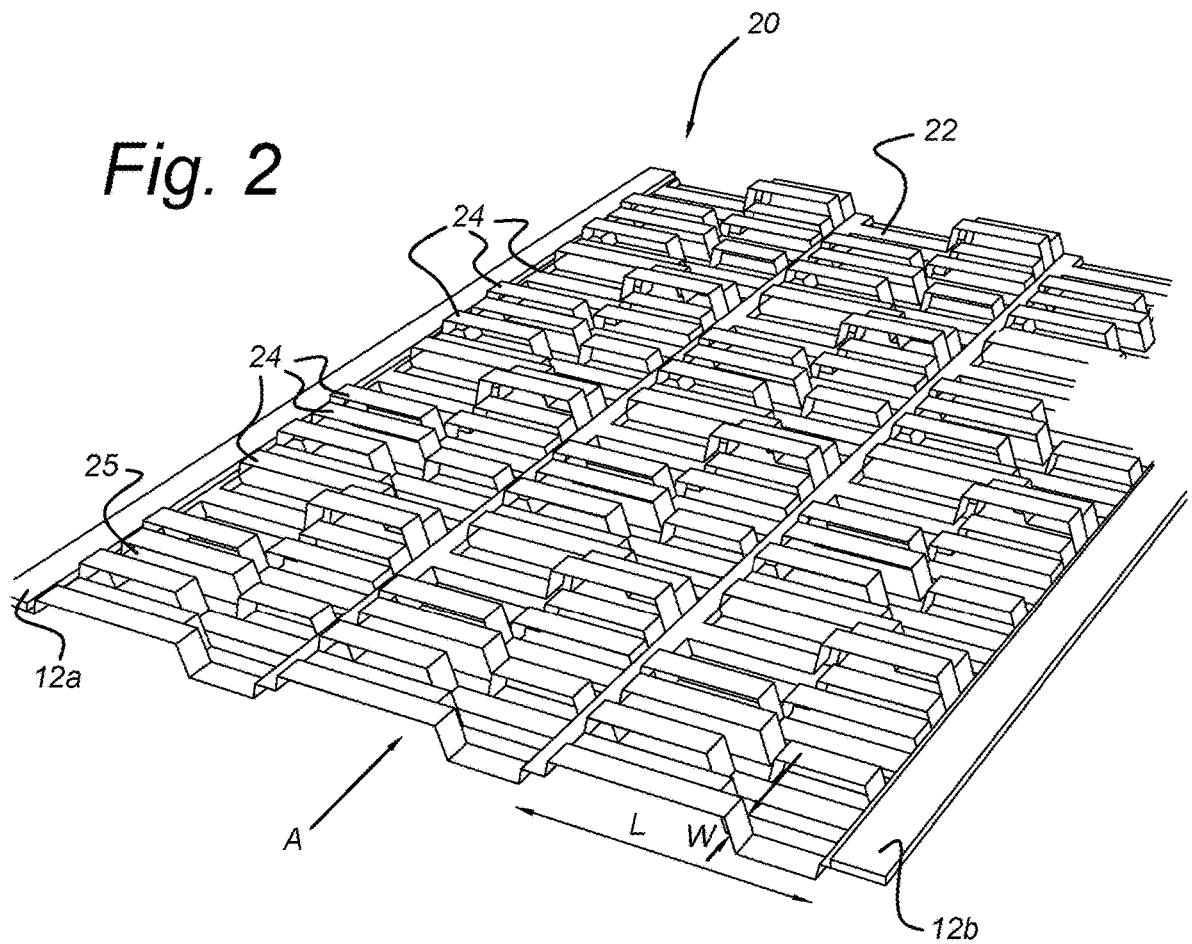
FIG. 2 shows a water extracting device manufactured from the laminate of FIG. 1.

FIG. 2 shows a water extracting device 20 manufactured from the LCST laminate 1 of FIG. 1. According to FIG. 2, the carrier layer 2 has been formed by a rolling and cutting technique into a carrier structure 22 comprising a plurality of fins or strips 24 that are partially separated from each other by cuts 25. The strips 24 are formed in a manner such that adjacent strips protrude from a main plane of the laminate 1 by different amounts. The resulting device 20 has an advantageous form that increases turbulence of an air flow across it whereby better moisture transport may be achieved. In the present embodiment, the strips 24 each have a length L of around 20 mm and a width W of around 2 mm. Nevertheless, the skilled person will understand that other configurations may also be used. Furthermore, although not shown, it will be understood that the carrier layer 2 is laminated with a fibrous material layer 4, a resistive heating layer 6 and a protective layer 9 as described in relation to FIG. 1. The lamination of these layers is sufficient to ensure that they will remain attached during the forming process. The electrodes 12a, 12b are located at opposed edges of the device 20 such that a potential differences applied between the two electrodes results in an electric field aligned in the direction of the strips 24.

Figure 2A:
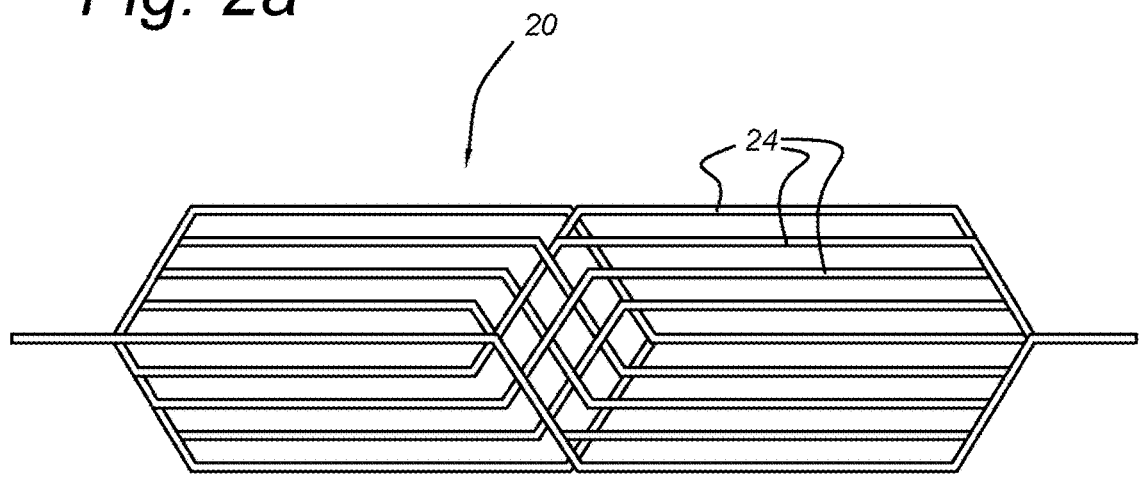
FIG. 2A is a view of a portion of the device of FIG. 2 taken in direction A.

Advantageously, each strip 24 is formed to have the same overall length which prevents distortion of the laminate 1 during the forming process. FIG. 2A is a detail of a portion of the device 20 taken in direction A in FIG. 2, indicating the shape of the strips 24.

Figure 3:
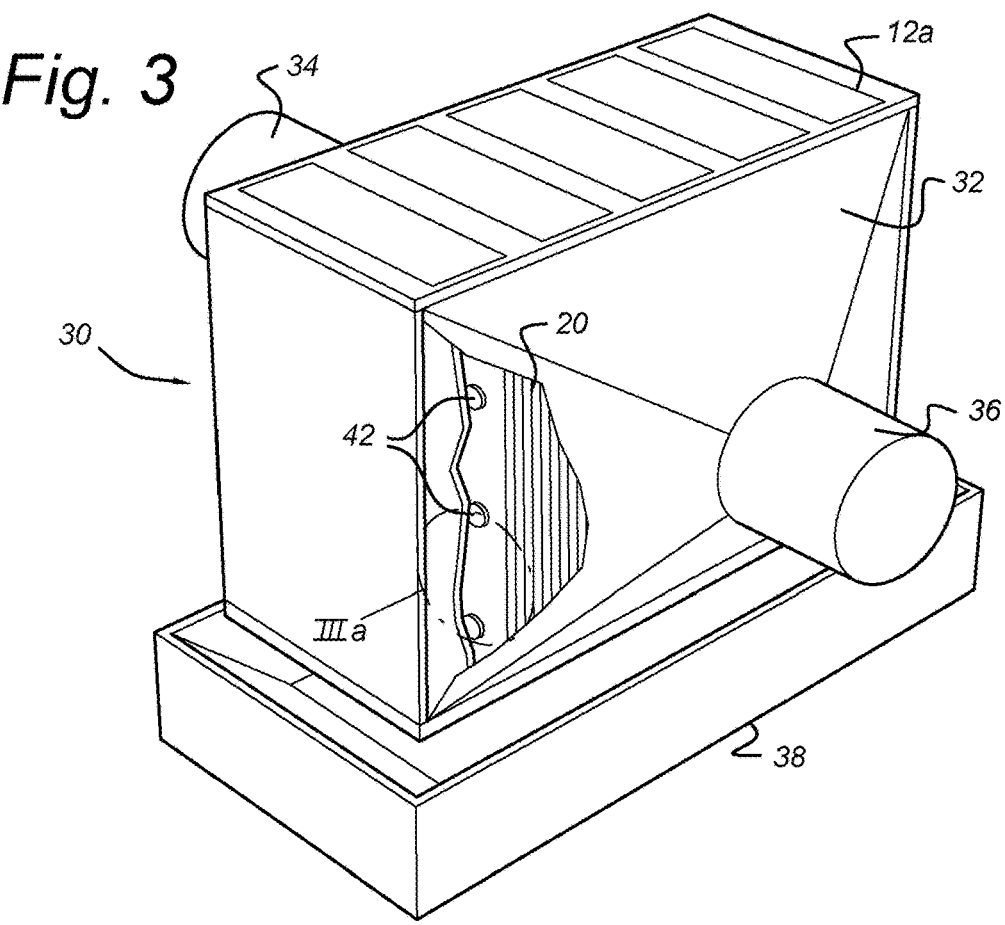
FIG. 3 shows a system for extracting water comprising a plurality of the devices of FIG. 2.

FIG. 3 shows a system 30 for extracting water in which a plurality of water extracting devices 20 are provided in a housing 32 having an inlet 34 and an outlet 36. The devices 20 are arranged vertically with the strips 24 extending in a vertical direction. At the lower side of the housing 32 is a collector 38. Electrodes 12a are shown at the upper side of the extracting devices 20, divided into zones allowing each zone to be heated independently. Similar electrodes (not shown) are located at the lower side of the extracting devices 20. An appropriate electrical supply (not shown) is electrically coupled to the electrodes to provide them with power.

Figure 3A:
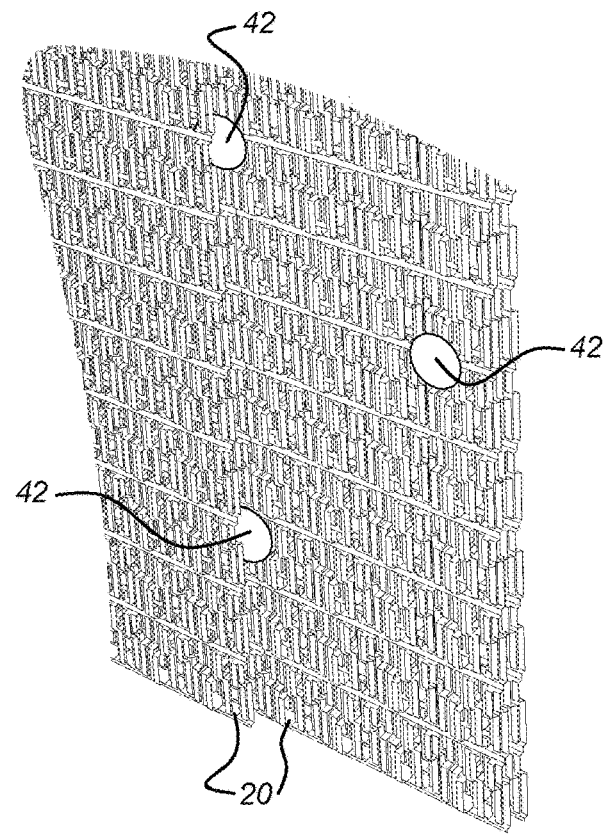
FIG. 3A shows a detail of the system of FIG. 3.

FIG. 3A shows a detail of the system 30 illustrating the orientation of the respective water extracting devices 20 and showing spacers 42 between the respective water extracting devices 20 to hold them apart.

Figure 4:
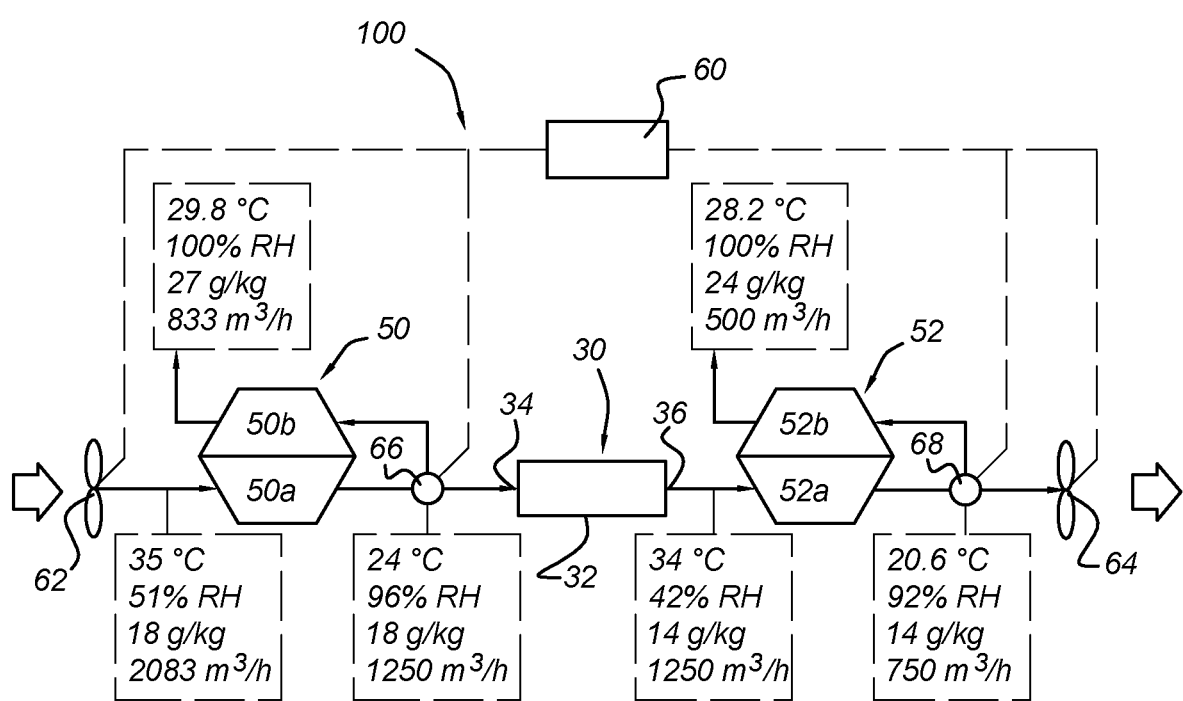
FIG. 4 shows a schematic air handling circuit according to an embodiment of the invention.

According to FIG. 4, there is shown an embodiment of the invention in which the system 30 of FIG. 3 is incorporated into an air handling circuit 100. The system 30 is placed in series between a first indirect evaporative cooler 50 and a second indirect evaporative cooler 52. The indirect evaporative coolers 50, 52 have primary 50a, 52a and secondary 50b, 52b channels, being in heat conducting relation with each other and whereby at least the secondary channels 50b, 52b are provided with a supply of water. The indirect evaporative coolers 50, 52 are of the type disclosed in WO2008055981 although other similar evaporative cooling devices may be used such as that shown in WO03/091633. A controller 60 is operatively connected to an inlet fan 62, an outlet fan 64 and first 66 and second 68 bypass valves. Sensors (not shown) for temperature, humidity, flow rate and any other relevant parameters are provided at appropriate locations in the circuit to provide feedback of flow conditions to the controller 60.

In a prophetic flow configuration and with reference to FIGS. 1 to 4, the controller 60 is implemented to take fresh outdoor air having temperature of 35° C. and 18 g/Kg water with a relative humidity (RH) of 51% and deliver it at a flow rate of 2083 m³/h to the primary channel 50a. The air is cooled down to close to the dew point at the outlet of the primary channel 50a by a bypass flow through the secondary channel 50b as is conventional for dewpoint coolers. The first bypass valve 66 is controlled to allow a flow of 833 m³/h through the secondary channel 50b, which is humidified by addition of water and exits with a temperature of 29.8° C. and 27 g/Kg water at 100% RH. The net flow leaving the first indirect evaporative cooler 50 is 1250 m³/h, having a temperature of 24.0° C., 18 g/Kg water and relative humidity of 96%. This flow is supplied to the inlet 34 of the system 30 for extracting water. As the air flows over the water extracting devices 20 located within the housing 32, because the temperature is below the LCS temperature, water is absorbed by the LCST polymer material. The air exits the housing 32 through the outlet 36 with just 14 g/Kg water and a relative humidity of 42%. Due to the heat of absorption, the temperature of the air stream has increased adiabatically to 34.0° C., which is still below the LCS temperature.

On leaving the outlet 36 of the system 30, the air is supplied to the primary channel 52a of the second indirect evaporative cooler 52. Here again, a bypass flow is directed by second bypass valve 68 through the secondary channel 52 where it is wetted by addition of water, causing cooling of the air flow in the primary channel 52a to close to the dewpoint. A secondary flow of 500 m$^3$/h is bypassed via the secondary channel 52b and exits at 28.2° C. with 24 g/Kg water at 100% RH. The net flow leaving the second indirect evaporative cooler 52 is 750 m$^3$/h having a temperature of just 20.6° C. and 14 g/Kg water with 92% RH. This may be delivered e.g. to a habitable space. It will be understood that the first evaporative cooler 50 serves to maintain the system 30 below the LCS temperature, while the second evaporative cooler 52 utilises the low humidity air in a further cooling process.

Periodically, the LCST polymer material in the system 30 becomes saturated. At this time, the controller 60 operates to supply a voltage across the electrodes 12a, 12b to cause heating of the resistive heating layer 6. As the temperature rises above the LCS temperature, the PNIPAAm layer 10 releases the absorbed water, which drips down into the collector 38. Because the electrodes 12a, 12b are arranged in zones, it is possible to apply a voltage across just certain zones whereby other zones can continue to absorb moisture. It will be understood by the skilled person that, although not shown, appropriate valving could be arranged to prevent flow to those zones that are being heated.

Figure 5:
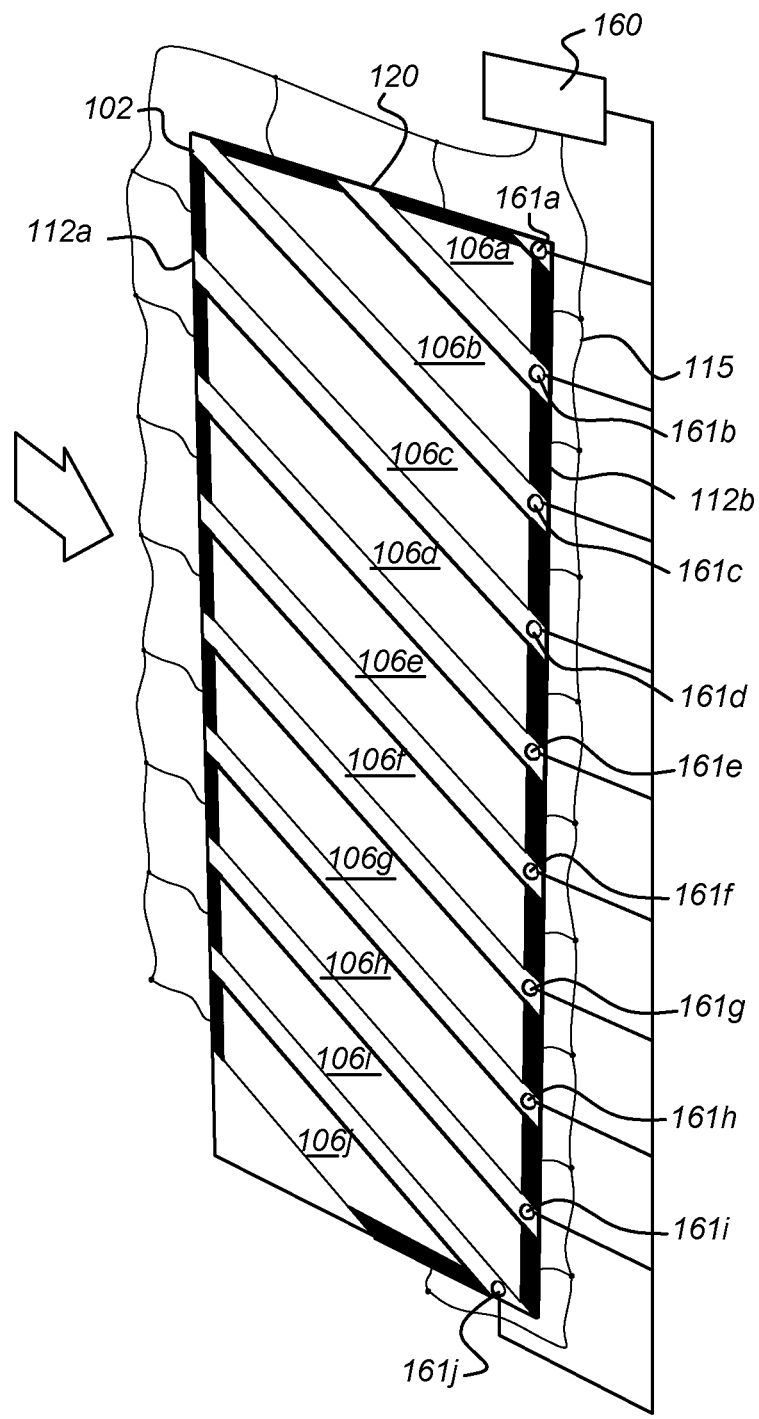
FIG. 5 shows in perspective view a water extracting device according to a second embodiment of the invention.

FIG. 5 shows a second embodiment of a water extracting device 120, similar to that of FIG. 2. In this case, the resistive heating layer 106 has been applied in zones 106A-J extending diagonally across the carrier layer 102. Each zone 106A-J is provided with its own respective electrodes 112A and 112B connected by electrical connections 115 to a controller 160. The controller 160 and connections 115 are arranged such that each of the zones 106A-J can be individually addressed to cause selective heating zone by zone as may be required. Sensors 161A-J are provided on the carrier layer 102 adjacent each zone 106A-J to provide feedback regarding the flow passing over the respective zone to the controller 160. In this manner, the device 120 can be controlled adaptively based on sensed conditions such as temperature, humidity and absorbed water. The diagonal orientation of the zones is advantageous in ensuring that once water is released by the LCST polymer on heating of a respective zone, it will traverse the carrier layer 102 diagonally downwards towards the rear edge of the device 120. It will nevertheless be understood that other configurations of zones may be implemented according to the effect required. The embodiment of FIG. 5 is shown as a flat laminate without fins. It will nevertheless be understood that the same construction may be provided with fins or strips of the type disclosed in FIG. 2.

Thus, the invention has been described by reference to the embodiment discussed above. It will be recognized that this embodiment is susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A water extracting device configured to remove water vapor from air comprising: a carrier structure; a substrate of fibrous material comprising a plurality of individual fibres, each individual fibre comprising a core and a quantity of an LCST polymer forming a layer surrounding the core; a heating provision arranged to selectively heat the LCST polymer to above its lower critical temperature whereby liquid water absorbed by the fibres can be subsequently released on heating, wherein the carrier structure is at least partially integrated with the heating provision and comprises a conducting metal foil divided into a plurality of fins, separated from each other by cuts, and through which air can circulate between a first surface of the conducting metal foil and a second surface of the conducting metal foil and the fibrous material is laminated to the first surface to form an LCST laminate, the water extracting device comprising a plurality of layers of LCST laminate, spaced from each other by spacers; and a collector arranged below the carrier structure to collect the liquid water released from the fibres.

2. The device according to claim 1, wherein the LCST polymer is poly(N-isopropylacrylamide) (PNIPAAm).

3. The device according to claim 1, wherein the fibres comprise natural fibres.

4. The device according to claim 1, wherein a resistive heating element is provided on the second surface of the conducting metal foil.

5. The device according to claim 4, wherein the resistive heating element comprises a carbon containing layer, comprising carbon black particles.

6. The device according to claim 4, wherein the resistive heating element covers regions of the substrate and other regions of the substrate are free of the resistive heating element and any other heating elements.

7. The device according to claim 4, wherein the carrier structure comprises a generally rectangular panel and the resistive heating element comprises strips extending across the panel that can be selectively activated.

8. A system comprising a housing having an inlet and an outlet and the water extracting device according to claim 1, whereby moist air can flow from the inlet to the outlet over the substrate and circulate between the surfaces of the conducting metal foil and the LCST polymer can absorb moisture from the air and subsequently release it as liquid water in response to an external stimulus for collection by the collector.

9. The system according to claim 8, wherein the housing further comprises a drain and a gravity flow structure leading to the drain.

10. The system according to claim 8, further comprising a heat exchanger communicating with the outlet, whereby air leaving the outlet can flow through the heat exchanger and be cooled.

11. A method of extracting entrained water vapour from a fluid stream comprising: providing the device according to claim 1; passing a flow of humid air having a temperature below the lower critical temperature over the device whereby the air is in contact with the LCST polymer and the LCST polymer absorbs a quantity of water vapour; activating the heating provision to selectively heat the LCST polymer to above its lower critical solution temperature whereby liquid water absorbed on the fibres is released; and collecting the released liquid water.

12. An LCST laminate comprising a carrier layer of conducting metal foil, cut into a plurality of fins, partially separated from one another, a fibrous material layer provided on at least one surface of the conducting metal foil, the fibrous material comprising a plurality of individual fibres with spaces between the individual fibres such that air can circulate, each individual fibre comprising a core and a quantity of an LCST polymer grafted onto an outer surface of the core forming a layer surrounding the core, and a resistive heating layer.

13. The LCST laminate according to claim 12, wherein the laminate is generally planar and the fins are formed by pressing or moulding to protrude from a plane of the laminate.

14. The LCST laminate according to claim 12, wherein the carrier layer comprises aluminium.

15. The LCST laminate according to claim 12, wherein the resistive heating layer comprises carbon black.

16. The device as claimed in claim 1, wherein the LCST polymer is grafted onto a surface of the core.

17. The device as claimed in claim 1, wherein the core is a cotton core.

18. The system as claimed in claim 8, wherein the plurality of fins are aligned in a direction between the inlet and the outlet such that air can flow along the conducting metal foil and alternatingly circulate between the first and second surfaces.

19. The device as claimed in claim 1, wherein the conducting metal foil comprises aluminum.

* * * * *